(12) United States Patent
Kojima et al.

(10) Patent No.: US 7,324,325 B2
(45) Date of Patent: Jan. 29, 2008

(54) LAMINATED CERAMIC ELECTRONIC COMPONENT

(75) Inventors: Tatsuya Kojima, Tokyo (JP); Toru Tonogai, Tokyo (JP); Shogo Murosawa, Tokyo (JP); Raitaro Masaoka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/669,973

(22) Filed: Feb. 1, 2007

(65) Prior Publication Data

US 2007/0211404 A1 Sep. 13, 2007

(30) Foreign Application Priority Data

Mar. 10, 2006 (JP) .............................. 2006-066046

(51) Int. Cl.
*H01G 4/06* (2006.01)
*H01G 4/00* (2006.01)

(52) U.S. Cl. ....................................... 361/311; 361/303
(58) Field of Classification Search ........ 361/303–305, 361/311–313, 321.1, 321.2
See application file for complete search history.

(56) References Cited

U.S. PATENT DOCUMENTS 6,377,439 B1 * 4/2002 Sekidou et al. ............. 361/303

6,912,115 B2 * 6/2005 Kobayashi et al. ......... 361/306.3

FOREIGN PATENT DOCUMENTS

| JP | 10-22161 | 1/1998 |
|---|---|---|
| JP | 2000-315621 | 11/2000 |
| JP | 2001-35738 | 2/2001 |
| JP | 2005-136132 | 5/2005 |

\* cited by examiner

*Primary Examiner*—Eric Thomas
(74) *Attorney, Agent, or Firm*—Oblon, Spivak, McClelland, Maier & Neustadt, P.C.

(57) ABSTRACT

A laminated ceramic electronic component has a plurality of conductive layers embedded in a ceramic substrate. The laminated ceramic electronic component includes: a functional area composed of the plurality of conductive layers and ceramic layers interposed therebetween; and a protective area formed around the functional area to have a ring-like cross section. The laminated ceramic electronic component satisfies the following condition:

$$0 < t/Wg \leq 0.80,$$

where t represents a wall thickness of the protective area in a vertical direction, and Wg represents a wall thickness of the protective area in a transverse direction.

2 Claims, 5 Drawing Sheets

LAMINATED CERAMIC ELECTRONIC COMPONENT

BACKGROUND OF THE INVENTION

1. Field of the Invention

The present invention relates to a laminated ceramic electronic component.

2. Description of the Related Art

Typically a laminated ceramic capacitor, which is one of laminated ceramic electronic components, is manufactured by the following process. At first, an internal electrode formed of a conductive paste is disposed on the upper surface of a ceramic green sheet formed of a ceramic paste. Then, a plurality of such ceramic green sheets each having an internal electrode disposed thereon are stacked to form a functional laminate, and protective laminates formed of ceramic green sheets without any substantial internal electrode are disposed above and below the functional laminate. The sheet laminate composed of the functional laminate and the overlying and underlying protective laminates is then pressed and cut into a given size corresponding to a single capacitor to obtain a laminated chip of a rectangular parallelepiped shape. Moreover, the laminated chip is subjected to a binder removal treatment for removal of binder and the like, baked under prescribed conditions, and formed with external electrodes on opposite sides of the laminated chip to obtain a laminated ceramic capacitor (see Japanese Unexamined Patent Application Publication No. H10-22161).

In such a laminated ceramic electronic component formed by stacking ceramic green sheets with internal electrodes partially interposed therebetween, however, cracks sometimes occur to extend from an upper or lower face perpendicular to the lamination direction to a right or left side face parallel to the lamination direction. It is the inventors' understanding that recently the likelihood of occurrence of cracks tends to increase as the volume occupancy of the internal electrodes and the ceramic layers therebetween increases with the miniaturization and capacity increase of the laminated ceramic electronic component.

SUMMARY OF THE INVENTION

It is an object of the present invention to provide a laminated ceramic electronic component which can inhibit occurrence of cracks extending from an upper or lower face to a right or left side face without interfering with miniaturization and capacity increase.

In order to achieve the above object, the present invention provides a laminated ceramic electronic component having a plurality of conductive layers embedded in a ceramic substrate, comprising:

a functional area composed of the plurality of conductive layers and ceramic layers interposed therebetween; and a protective area formed around the functional area to have a ring-like cross section, and satisfying the following condition:

$$0 < t/Wg \leq 0.80,$$

where t represents a wall thickness of the protective area in a vertical direction, and Wg represents a wall thickness of the protective area in a transverse direction.

Preferably, the laminated ceramic electronic component further satisfies the following condition:

$$0 < t/Wg \leq 0.57.$$

Also preferably, the laminated ceramic electronic component further satisfies the following condition:

$$0.24 \leq (2Wg/W) \leq 0.6,$$

where W represents an overall width of the protective area in the transverse direction.

According to the present invention, the occurrence of cracks extending from an upper or lower face to a right or left side face can be inhibited without interfering with miniaturization and capacity increase.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
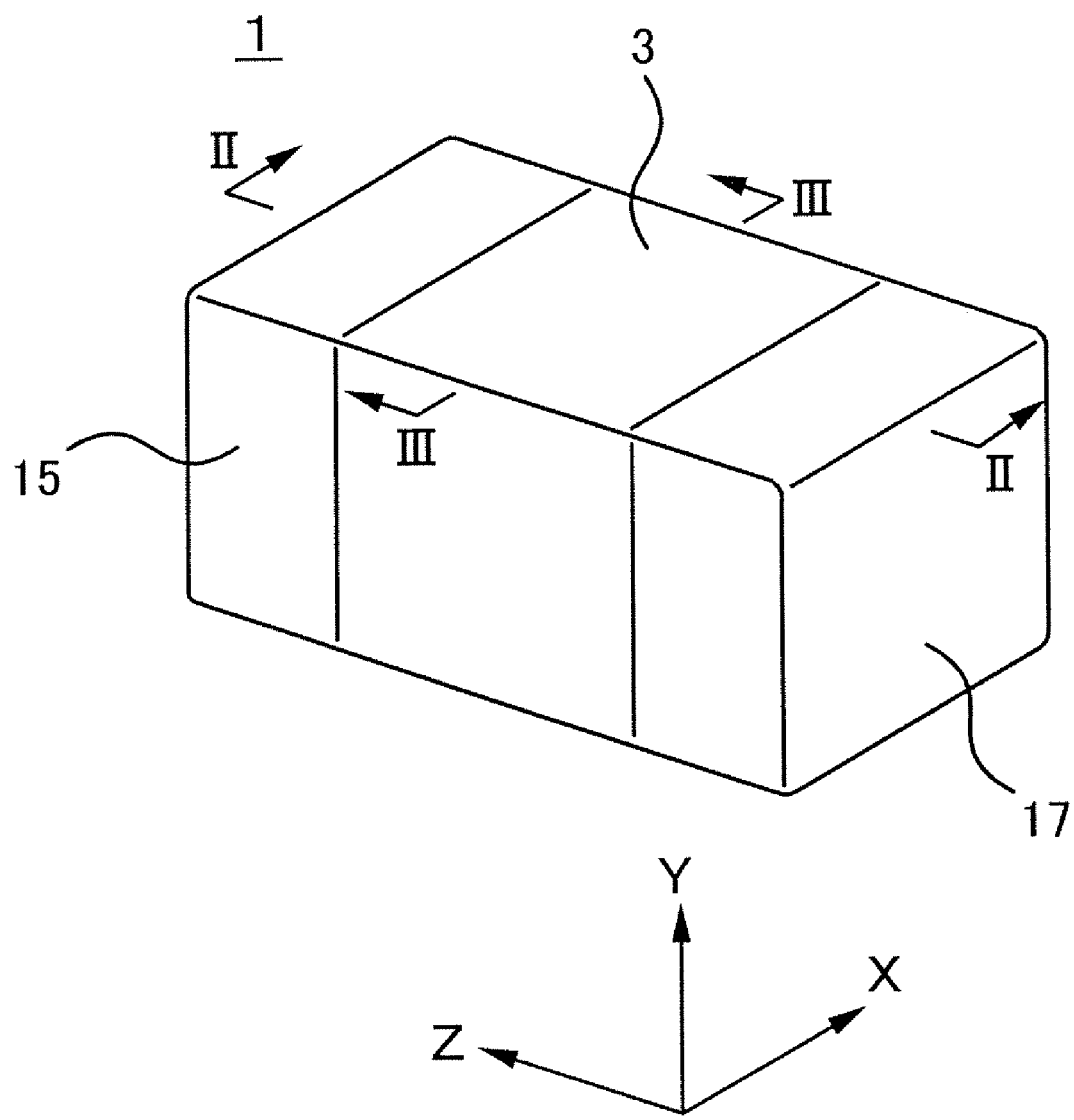
FIG. 1 is a perspective view of a laminated ceramic capacitor according to one embodiment of the present invention.

Hereinbelow the laminated ceramic electronic component according to the present invention is embodied in a laminated ceramic capacitor and described with reference to the accompanying drawings. In the drawings, the same or similar portions are designated by the same reference signs.

Figure 2:
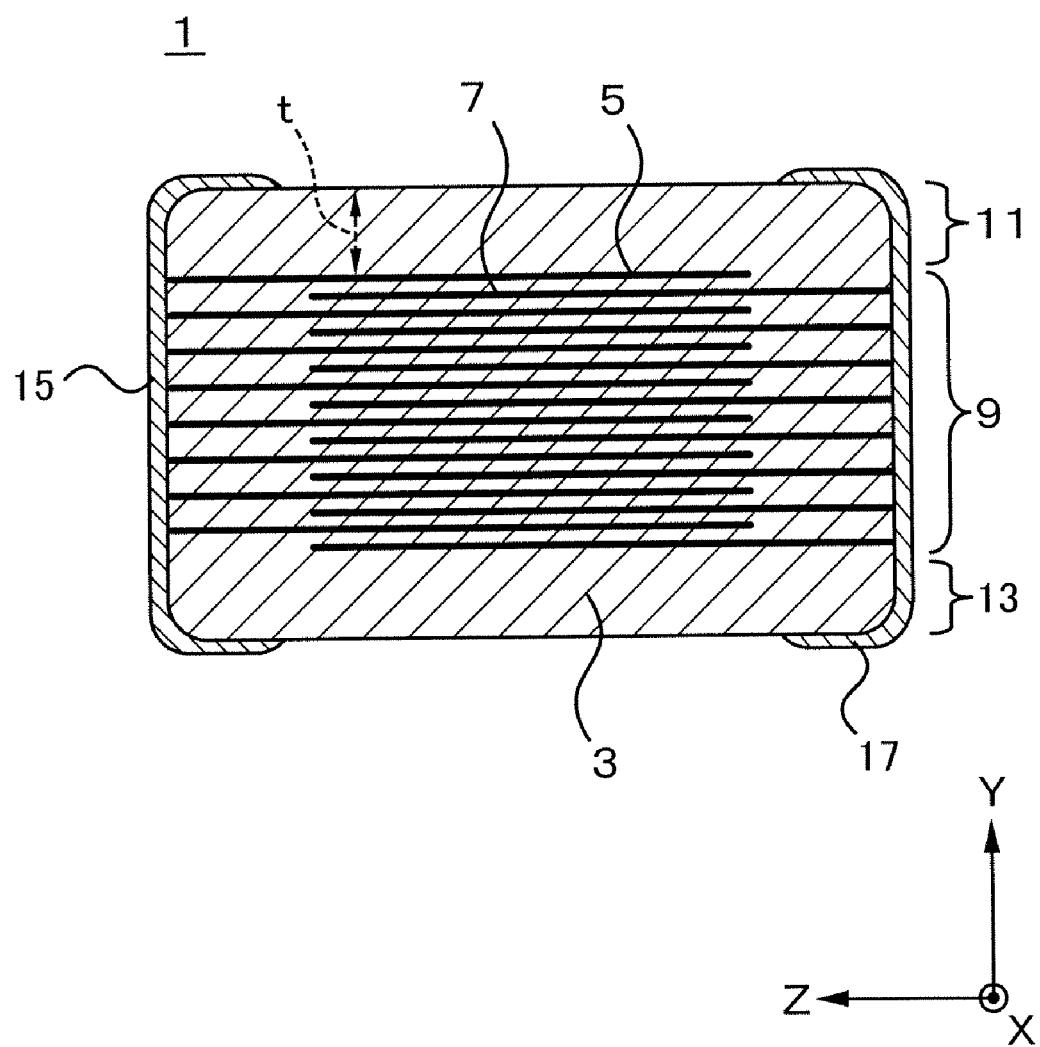
FIG. 2 is a sectional view taken along line II-II of FIG. 1.
Figure 3:
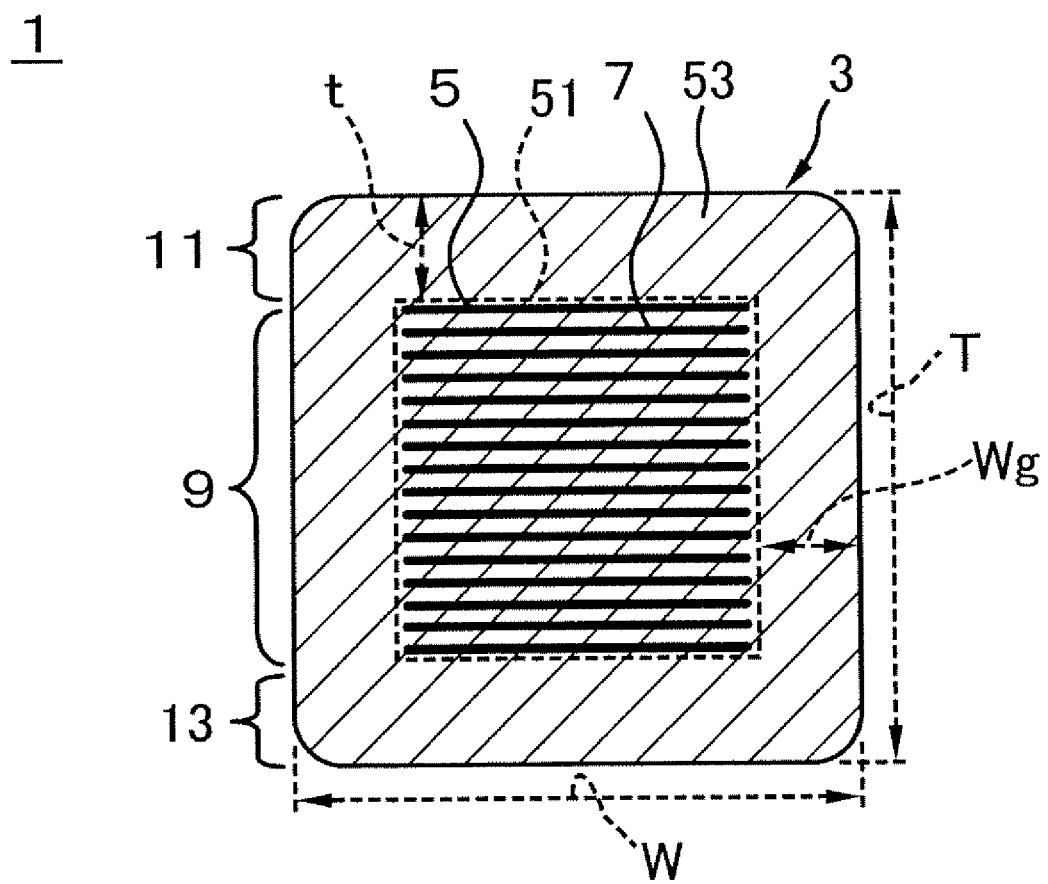
FIG. 3 is a sectional view taken along line III-III of FIG. 1.
Figure 3:
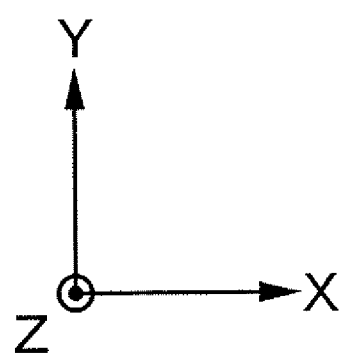

Referring to FIGS. 1 to 3, a laminated ceramic capacitor 1 is a component of a generally rectangular parallelepiped shape. Throughout the description and claims, the vertical direction "Y" refers to a lamination direction, the longitudinal direction "Z" refers to a terminal leading-out direction perpendicular to the vertical direction, and the transverse direction "X" refers to a direction perpendicular to both the vertical direction and the longitudinal direction.

The laminated ceramic capacitor 1 comprises a ceramic substrate 3 and terminal electrodes (or external electrodes) 15 and 17 on opposite sides of the ceramic substrate 3.

As shown in FIGS. 2 and 3, a plurality of internal electrodes (or conductive layers) 5 and 7 are embedded in the ceramic substrate 3. As will be described later, the ceramic substrate 3 is formed by stacking a plurality of ceramic green sheets.

As particularly shown in FIG. 2, the vertically adjacent internal electrodes 5 and 7 are arranged to have alternate extensions reaching the terminal electrodes 15 and 17. In other words, the internal electrodes 5 are electrically connected to the terminal electrode 15, while the internal electrodes 7 are electrically connected to the terminal electrode 17. Moreover, the vertically adjacent internal electrodes 5 and 7 are opposed to each other across a ceramic layer which is a component of the ceramic substrate 3. The number of internal electrodes 5 and 7 varies depending on the required electrostatic capacity.

The ceramic substrate 3 has an inner layer portion 9 and a pair of upper and lower outer layer portions 11 and 13. Strictly speaking, the internal electrodes 5 and 7 are embedded in the inner layer portion 9 of the ceramic substrate 3. The upper outer layer portion 11 is disposed above the inner layer portion 9, while the lower outer layer portion 13 is disposed below the inner layer portion 9.

It should be noted that the upper outer layer portion refers to a portion above the uppermost one of the internal electrodes (or conductive layers) which bear the primary function of the electronic component, while the lower outer layer portion refers to a portion below a sheet on which the lowermost one of the internal electrodes (or conductive layers) is formed.

As shown in FIG. 3, the laminated ceramic capacitor 1 may be conceptually divided into two areas: one being a functional area 51 composed of the internal electrodes 5 and 7 and the ceramic layers interposed therebetween; the other being a protective area 53 formed around the functional area.

The functional area 51 is a conceptual area having a generally rectangular shape in the XY-section and extending in the Z-direction to have a generally rectangular parallelepiped shape. On the other hand, the protective area 53 is a conceptual area having a ring shape (whose inner and outer peripheries are both rectangular) in the XY-section and also extending in the Z-direction to have a tubular shape.

In the illustrated embodiment, more specifically, the functional area 51 is composed of a portion of the inner layer portion 9, i.e., the internal electrodes 5 and 7 and the ceramic layers interposed therebetween, while the protective area 53 is composed of the upper and lower outer layer portions 11 and 13 and the rest of the inner layer portion 9, i.e., the ceramic portions lying on the transversely opposite sides of the stacked internal electrodes 5 and 7.

According to the present invention, the laminated ceramic capacitor 1 satisfies the following condition:

$$0 < t/Wg \leq 0.80,$$

where t represents a ring wall thickness of the protective area 53 in the vertical direction, and Wg represents a ring wall thickness of the protective area 53 in the transverse direction, as shown in FIG. 3. Preferably, it further satisfies the following condition:

$$0 < t/Wg \leq 0.57.$$

In the illustrated embodiment, furthermore, the laminated ceramic capacitor 1 satisfies the following condition:

$$0.24 \leq (2Wg/W) \leq 0.6,$$

where W represents an overall width of the protective area 53 in the transverse direction.

Figure 4:
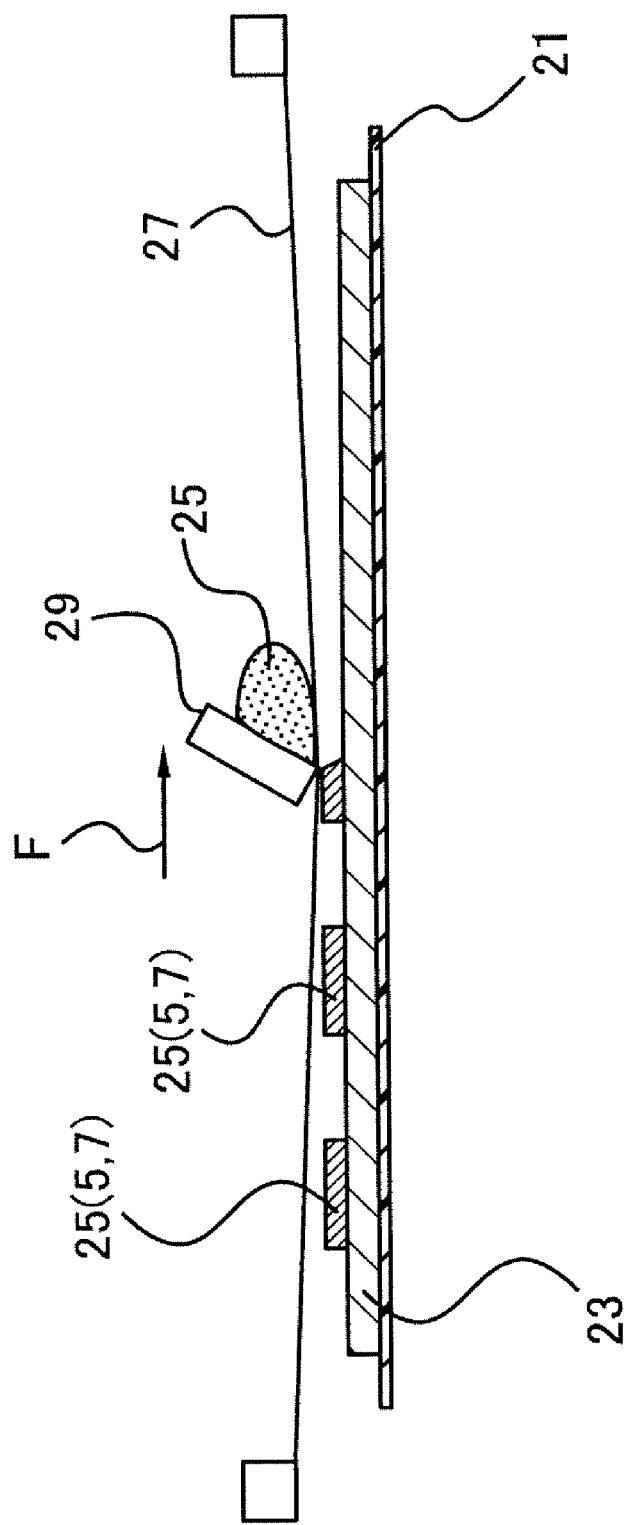
FIG. 4 is a schematic diagram showing a process of forming a ceramic green sheet to be used for a functional area.

Next will be briefly described a process of manufacturing a laminated ceramic capacitor according to one embodiment of the present invention. At first, formation of a sheet for the inner layer portion 9 will be described with reference to FIG. 4. As shown in FIG. 4, a dielectric paste containing ceramic powder, a binder, a solvent and a plasticizer as required is applied to the upper surface of a flexible PET film 21 and dried to obtain a ceramic green sheet 23. Application of the dielectric paste may be performed using a doctor blade or an extrusion head. Eventually, the ceramic green sheet 23 will become a ceramic layer which is a component of the ceramic substrate 3.

Subsequently, a conductive paste 25 is applied at spaced apart locations on the upper surface of the dried ceramic green sheet 23 for formation of the internal electrodes 5 and 7. The conductive paste 25 contains at least conductive powder, a binder and a solvent. The conductive paste 25 may be applied such as by screen printing or gravure printing, and FIG. 4 illustrates screen printing. Printing is performed by pushing out the conductive paste 25 onto the ceramic green sheet 23 with a squeegee 29 slid on a screen 27 in the direction of an arrow F. The printed conductive paste is then dried to obtain the internal electrodes 5 and 7.

On the other hand, a ceramic green sheet for the outer layer portion is manufactured by a different process from the above-described process of manufacturing the ceramic green sheet 23 for the inner layer portion. The ceramic green sheet for the outer layer portion can also be obtained by applying and drying a dielectric past containing ceramic powder, a binder, a solvent and a plasticizer as required. Similarly, there may be used a doctor blade or an extrusion head.

Figure 5:
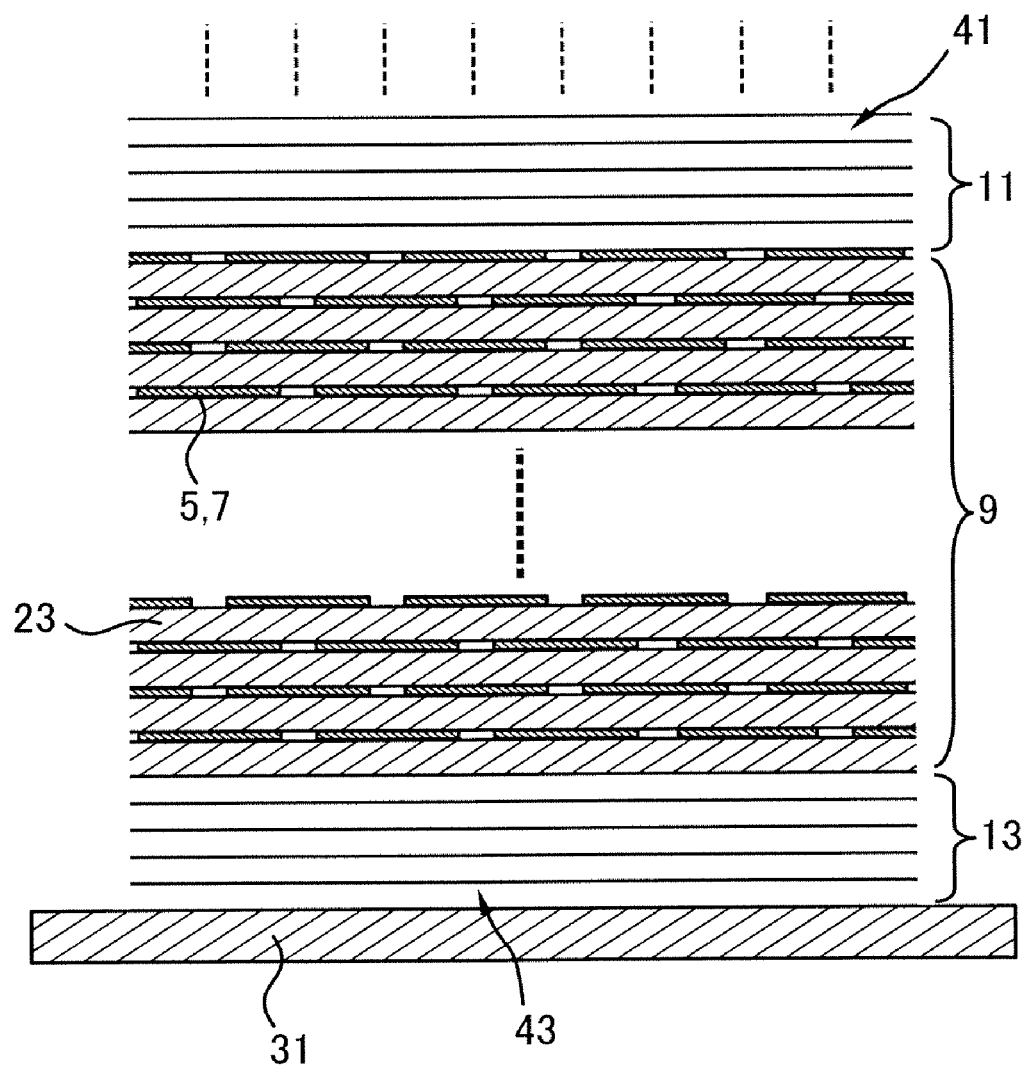
FIG. 5 is a schematic diagram showing a state where ceramic green sheets are stacked in a process of manufacturing a laminated ceramic capacitor according to one embodiment of the present invention.

These ceramic green sheets thus prepared are then stacked as shown in FIG. 5. After a required number of ceramic green sheets 43 for the lower outer layer portion 13 are stacked in order on a receiving table 31, a required number of ceramic green sheets 23 for the inner layer portion 9 are stacked in order thereon. Moreover, a required number of ceramic green sheets 41 for the upper outer layer portion 11 are stacked in order on the inner layer portion 9.

Stacking of ceramic green sheets may be performed in various ways. For example, the inner layer portion and the outer layer portion may be combined together after being separately prepared by stacking a required number of ceramic green sheets for the inner layer portion and a required number of ceramic green sheets for the outer layer portion. In an alternative, a number of ceramic green sheet laminates thinner than the inner layer portion and the outer layer portion may be stacked in order after being prepared by stacking and drying a few ceramic green sheets. In another alternative, each ceramic green sheet may be formed and dried directly on another ceramic green sheet.

Upon stacking the ceramic green sheets 23 for the inner layer portion, adjacent two ceramic green sheets 23 are offset to have the internal electrodes 5 and 7 of one ceramic green sheet 23 overlapping with the internal electrodes 5 and 7 of the other ceramic green sheet 23.

Thereafter, the green sheet laminate is pressed and cut to obtain a plurality of green chips of a rectangular parallelepiped shape. Moreover, after subjected to a binder removal treatment for burnout of the binder component, the green chip is baked and formed with the terminal electrodes 15 and 17 to obtain the laminated ceramic capacitor 1 shown in FIG. 1.

Next will be described the effects of the laminated ceramic capacitor of the illustrated embodiment. As described above, cracks sometimes occur in a laminated ceramic capacitor to extend from the upper or lower face to the right or left side face. It is the inventors' understanding that the likelihood of occurrence of cracks tends to increase with increase in volume occupancy of the functional area in the laminated ceramic capacitor. Since this tendency seems to be caused by a decrease in wall thickness of the protective area, which results in a decrease in strength of the protective area, this problem may be usually addressed by uniformly increasing the diameter of the outer periphery of the ring-like protective area to attain sufficient wall thickness or uniformly decreasing the diameter of the inner periphery of the ring-like protective area to attain sufficient wall thickness. However, the former is undesirable because it leads to an increase in size of the entire laminated ceramic capacitor. On the other hand, the latter is undesirable for maintaining or increasing the capacity because it means a decrease in volume occupancy of the functional area in the laminated ceramic capacitor.

In the latter, furthermore, the inventors' study has revealed that decreasing the diameter of the inner periphery of the protective area does not have a commensurate effect of preventing the occurrence of cracks. Hence, the inventors have arrived at the idea of separately adjusting the wall thickness t of the protective area 53 parallel to the lamination direction and the wall thickness Wg of the protective area 53 perpendicular to the lamination direction. This will be described with reference to following Table I and Table 2.

Table 1

| SampleNo. | Wall thickness Wg (μm) | Wall thickness t | Occurrence of cracks (ppm) |
|---|---|---|---|
| 1 | 60 | 0 | insufficient protection |
| 2 | 60 | 10 | 0 |
| 3 | 60 | 30 | 1,000 |
| 4 | 60 | 50 | 5,000 |
| 5 | 60 | 80 | 11,000 |
| 6 | 60 | 100 | 80,000 |
| 7 | 60 | 120 | 140,000 |
| 8 | 60 | 150 | 220,000 |
| 9 | 100 | 0 | insufficient protection |
| 10 | 100 | 10 | 0 |
| 11 | 100 | 30 | 0 |
| 12 | 100 | 50 | 0 |
| 13 | 100 | 80 | 1,700 |
| 14 | 100 | 100 | 3,500 |
| 15 | 100 | 120 | 6,000 |
| 16 | 100 | 150 | 11,000 |
| 17 | 150 | 0 | insufficient protection |
| 18 | 150 | 10 | 0 |
| 19 | 150 | 30 | 0 |
| 20 | 150 | 50 | 0 |
| 21 | 150 | 85 | 0 |
| 22 | 150 | 100 | 800 |
| 23 | 150 | 120 | 2,200 |
| 24 | 150 | 150 | 4,000 |

※Overall width W and overall hight T remain constant, W = T = 500 (μm)

Table 1 shows test results about the occurrence of cracks. Test samples were laminated ceramic capacitors whose protective area had an overall width W of 500 [μm] in the transverse direction and an overall height T of 500 [μm] in the vertical direction. Moreover, the ring wall thickness Wg of the protective area in the transverse direction was varied in the range of 60 to 150 [μm] and the ring wall thickness t of the protective area in the vertical direction was varied in the range of 0 to 150 [μm] to prepare a variety of types of samples for investigation on the occurrence of cracks.

Comparing the sample Nos. 4, 14 and 24, at first, it is seen from Table 1 that uniformly increasing the transverse wall thickness Wg and the vertical wall thickness t did not considerably improve the occurrence of cracks. In addition, it is also seen that when the transverse wall thickness Wg was constant, the occurrence of cracks rather increased with increase in the vertical wall thickness t. More specifically, in the sample Nos. 1 to 8 having a constant wall thickness Wg=60 [μm], the occurrence of cracks increased with increase in the wall thickness t. Also in the sample Nos. 9 to 16 having a constant wall thickness Wg=100 [μm] and the sample Nos. 17 to 24 having a constant wall thickness Wg=150 [μm], the same tendency was observed.

In order to solve the above-mentioned problem, accordingly, the inventors have focused on the ratio t/Wg of the wall thickness t parallel to the lamination direction to the wall thickness Wg perpendicular to the lamination direction. In Table 2, the ratio t/Wg was calculated from data shown in Table 1.

TABLE 2

| | Sample No. | Wall thickness Wg (μm) | Wall thickness t | t/Wg | 2Wg/w | Occurrence of cracks (ppm) |
|---|---|---|---|---|---|---|
| Comparative | 1 | 60 | 0 | 0.00 | 0.24 | insufficient protection |
| Embodiment | 2 | 60 | 10 | 0.17 | 0.24 | 0 |
| Embodiment | 3 | 60 | 30 | 0.50 | 0.24 | 1,000 |
| Comparative | 4 | 60 | 50 | 0.83 | 0.24 | 5,000 |
| Comparative | 5 | 60 | 80 | 1.33 | 0.24 | 11,000 |
| Comparative | 6 | 60 | 100 | 1.67 | 0.24 | 80,000 |
| Comparative | 7 | 60 | 120 | 2.00 | 0.24 | 140,000 |
| Comparative | 8 | 60 | 150 | 2.50 | 0.24 | 220,000 |
| Comparative | 9 | 100 | 0 | 0.00 | 0.40 | insufficient protection |
| Embodiment | 10 | 100 | 10 | 0.10 | 0.40 | 0 |
| Embodiment | 11 | 100 | 30 | 0.30 | 0.40 | 0 |
| Embodiment | 12 | 100 | 50 | 0.50 | 0.40 | 0 |
| Embodiment | 13 | 100 | 80 | 0.80 | 0.40 | 1,700 |
| Comparative | 14 | 100 | 100 | 1.00 | 0.40 | 3,500 |
| Comparative | 15 | 100 | 120 | 1.20 | 0.40 | 6,000 |
| Comparative | 16 | 100 | 150 | 1.50 | 0.40 | 11,000 |
| Comparative | 17 | 150 | 0 | 0.00 | 0.60 | insufficient protection |
| Embodiment | 18 | 150 | 10 | 0.07 | 0.60 | 0 |
| Embodiment | 19 | 150 | 30 | 0.20 | 0.60 | 0 |
| Embodiment | 20 | 150 | 50 | 0.33 | 0.60 | 0 |
| Embodiment | 21 | 150 | 85 | 0.57 | 0.60 | 0 |
| Embodiment | 22 | 150 | 100 | 0.67 | 0.60 | 800 |
| Embodiment | 23 | 150 | 120 | 0.80 | 0.60 | 2,200 |
| Comparative | 24 | 150 | 150 | 1.00 | 0.60 | 4,000 |

※ Overall width W and overall hight T remain constant, W = T = 500 (μm)

It is seen from Table 2 that the occurrence of cracks could be held below 3000 [ppm] in the sample Nos. 2, 3, 10 to 13, 18 to 23 satisfying $0<t/Wg\leq0.80$, which were embodiments of the present invention. Moreover, the occurrence of cracks could be made substantially 0 [ppm] in the sample Nos. 2, 10 to 12, 18 to 21 satisfying $0<t/Wg\leq0.57$, which were more preferred embodiments of the present invention.

In the laminated ceramic capacitor according to one embodiment of the present invention, therefore, the occurrence of cracks extending from an upper or lower face to a right or left side face can be inhibited without interfering with miniaturization and capacity increase.

While the present invention has been particularly shown and described with reference to embodiments thereof, it will be understood by those skilled in the art that various changes in form and detail may be made therein without departing from the spirit, scope and teaching of the invention.

For example, the application of the present invention is not limited to laminated ceramic capacitors, but the present invention may be applicable to a wide variety of laminated ceramic electronic components as long as it has a functional area with conductive layers and ceramic layers and the functional area is surrounded by a protective area composed of ceramic layers. Examples other than the laminated ceramic capacitor include an inductor, a LC filter and an array element.

What is claimed is:

1. A laminated ceramic electronic component having a plurality of conductive layers embedded in a ceramic substrate, comprising:
   a functional area composed of said plurality of conductive layers and ceramic layers interposed therebetween; and
   a protective area formed around said functional area, and satisfying the following condition:

$$0<t/Wg\leq0.57,$$

where t represents a wall thickness of said protective area in a vertical direction, and Wg represents a wall thickness of said protective area in a transverse direction.

2. A laminated ceramic electronic component having a plurality of conductive layers embedded in a ceramic substrate, comprising:
   a functional area composed of said plurality of conductive layers and ceramic layers interposed therebetween; and
   a protective area formed around said functional area, and satisfying the following conditions:

$$0<t/Wg\leq0.80, \text{ and}$$

$$0.24\leq(2Wg/W)\leq0.6,$$

where t represents a wall thickness of said protective area in a vertical direction, Wg represents a wall thickness of said protective area in a transverse direction, and W represents an overall width of said protective area in said transverse direction.

* * * * *